US010225195B2

(12) United States Patent
Ko et al.

(10) Patent No.: US 10,225,195 B2
(45) Date of Patent: Mar. 5, 2019

(54) TELECOMMUNICATION SYSTEMS AND METHODS USING DYNAMIC SHAPING FOR ALLOCATING NETWORK BANDWIDTH

(71) Applicant: ADTRAN, INC., Huntsville, AL (US)

(72) Inventors: Kenneth D. Ko, Clearwater, FL (US); Richard L. Goodson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 15/456,513

(22) Filed: Mar. 11, 2017

(65) Prior Publication Data

US 2017/0187632 A1 Jun. 29, 2017

Related U.S. Application Data

(63) Continuation-in-part of application No. 14/706,732, filed on May 7, 2015, now Pat. No. 9,729,241.
(Continued)

(51) Int. Cl.
| | |
|---|---|
| *H04L 12/815* | (2013.01) |
| *H04L 12/863* | (2013.01) |
| *H04L 12/26* | (2006.01) |
| *H04B 10/278* | (2013.01) |
| *H04L 12/28* | (2006.01) |
| *H04L 12/64* | (2006.01) |
| *H04L 12/801* | (2013.01) |

(52) U.S. Cl.
CPC .......... *H04L 47/22* (2013.01); *H04B 10/278* (2013.01); *H04L 12/2874* (2013.01); *H04L 12/6418* (2013.01); *H04L 43/00* (2013.01); *H04L 43/026* (2013.01); *H04L 47/12* (2013.01); *H04L 47/50* (2013.01)

(58) Field of Classification Search
CPC ............................... H04L 47/22; H04L 47/50
See application file for complete search history.

(56) References Cited

U.S. PATENT DOCUMENTS

| 7,061,861 B1 | 6/2006 | Mekkittikul |
| 7,298,973 B2 | 11/2007 | Ovadia et al. |

(Continued)

FOREIGN PATENT DOCUMENTS

| WO | 2013/173665 A1 | 11/2013 |

OTHER PUBLICATIONS

"Technical Report DSL Forum TR-059, DSL Evolution—Architecture Requirements for the Support of QoS—Enabled IP Services," Digital Subscriber Line Forum, Sep. 2003.

*Primary Examiner* — Kashif Siddiqui
(74) *Attorney, Agent, or Firm* — Maynard Cooper & Gale, P.C.; Jon E. Holland

(57) ABSTRACT

A telecommunication system employs dynamic shaping based on current load conditions for at least one congestion point in order to achieve a fair allocation of network bandwidth. In one exemplary embodiment, shaper control logic communicates with virtual scheduler/shapers to learn current load conditions for at least one congestion point. Using such load information, the shaper control logic dynamically controls the shaper rates for the virtual scheduler/shapers so that packet flows for services of the same class passing through the congestion point achieve a desired (e.g., same or similar) performance regardless of which virtual scheduler/shaper is communicating each respective packet flow.

18 Claims, 11 Drawing Sheets

Related U.S. Application Data

(60) Provisional application No. 61/990,039, filed on May 7, 2014.

(56) References Cited

U.S. PATENT DOCUMENTS

| | | |
|---|---|---|
| 7,606,154 B1 | 10/2009 | Lee |
| 7,660,251 B2 | 2/2010 | Grosbach et al. |
| 7,697,844 B2 * | 4/2010 | Guo .................. H04L 47/10 370/320 |
| 8,437,355 B1 | 5/2013 | Goodson |
| 8,705,567 B2 | 4/2014 | Denney |
| 8,797,844 B1 | 8/2014 | Strahle |
| 8,902,777 B1 | 12/2014 | Huang |
| 8,937,865 B1 | 1/2015 | Kumar |
| 9,083,464 B2 | 7/2015 | Goodson |
| 9,729,241 B2 | 8/2017 | Goodson et al. |
| 9,935,884 B2 * | 4/2018 | Garofalo ........... H04L 47/2441 |
| 2002/0057650 A1 * | 5/2002 | Chuah ................ H04L 47/263 370/232 |
| 2002/0138561 A1 | 9/2002 | Chatfield |
| 2002/0138643 A1 | 9/2002 | Shin |
| 2003/0165148 A1 | 9/2003 | Bishard |
| 2005/0071504 A1 | 3/2005 | Handlogten et al. |
| 2007/0133989 A1 | 6/2007 | Kim et al. |
| 2007/0248109 A1 | 10/2007 | DeCarolis et al. |
| 2008/0049615 A1 | 2/2008 | Bugenhagen |
| 2008/0192636 A1 * | 8/2008 | Briscoe ................ H04L 47/10 370/236 |
| 2009/0103545 A1 | 4/2009 | Anschutz et al. |
| 2009/0109846 A1 | 4/2009 | Sinha |
| 2010/0008379 A1 | 1/2010 | Yoo et al. |
| 2010/0142524 A1 * | 6/2010 | Garofalo .............. H04L 47/10 370/389 |
| 2011/0182588 A1 | 7/2011 | Wojtowicz |
| 2012/0039173 A1 * | 2/2012 | Danzig .............. H04L 12/2801 370/235.1 |
| 2012/0127975 A1 | 5/2012 | Yang |
| 2012/0321315 A1 | 12/2012 | Timm |
| 2013/0304915 A1 | 11/2013 | Kawai |
| 2014/0092738 A1 | 4/2014 | Grandhi |
| 2014/0126907 A1 | 5/2014 | Hirth |
| 2014/0185451 A1 * | 7/2014 | Yip ...................... H04L 47/24 370/236 |
| 2015/0229430 A1 | 8/2015 | Liang |
| 2015/0350083 A1 | 12/2015 | Goodson et al. |

* cited by examiner

TELECOMMUNICATION SYSTEMS AND METHODS USING DYNAMIC SHAPING FOR ALLOCATING NETWORK BANDWIDTH

CROSS REFERENCE TO RELATED APPLICATION

This application is a continuation-in-part of and claims priority to U.S. patent application Ser. No. 14/706,732, entitled "Telecommunication Systems and Methods Using Dynamic Shaping for Allocating Network Bandwidth" and filed on May 7, 2015, which is incorporated herein by reference. U.S. patent application Ser. No. 14/706,732 claims priority to U.S. Provisional Patent Application No. 61/990,039, entitled "Systems and Methods for Scheduling Business and Residential Services in Optical Networks" and filed on May 7, 2014, which is incorporated herein by reference.

RELATED ART

Telephony networks are typically designed to provide a variety of services, such as telephone, Internet, and television services. Packet flows associated with the services may be grouped into classes, and the classes may be assigned priorities and weights. At various points in the network, congestion may occur such that the requested traffic or "load" exceeds the capacity of the network at that point. Schedulers and shapers are often used in order to allocate the network bandwidth among the competing services based on the priorities and weights that are assigned to the packet flows.

As network demand and size increase, it becomes more difficult to design and implement a network that ensures fair allocation of network bandwidth at various points in the network so that services of the same class achieve a desired (e.g., same or similar) performance across a range of customers. As an example, an access node is typically at an edge of a network where packet flows are demultiplexed in the downstream direction and multiplexed in the upstream direction. Such an access node may have several access modules inserted into and held by a chassis, and each access module may provide services to a large number of customers. Scheduling is often distributed across the access modules such that a given scheduler schedules packet flows for a single access module. Further, it is often the case that some packet flows achieve a significantly different level of performance than other packet flows of the same class depending on the overall configuration of the network and the current load conditions.

Techniques for reducing such disparities, thereby achieving a more fair allocation of network bandwidth, without significantly increasing the cost or complexity of the network are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to telecommunication systems that employ dynamic shaping across a plurality of access modules of an access node using a dynamic bandwidth allocation (DBA) algorithm that is based on current load conditions for each of the access modules in order to achieve a fair allocation of network bandwidth at the access node. In one exemplary embodiment, access modules at an access node communicate via a control channel with shaper control logic that receives load information from each of the access modules. Using such load information, the shaper control logic dynamically controls the shaper rates for the access modules so that a fair allocation of network bandwidth is achieved across all of the access modules. Specifically, the shaper rates are controlled such that packet flows for services of the same class achieve a desired performance (e.g., average data rate) regardless of which access module is communicating each respective packet flow.

Figure 1:
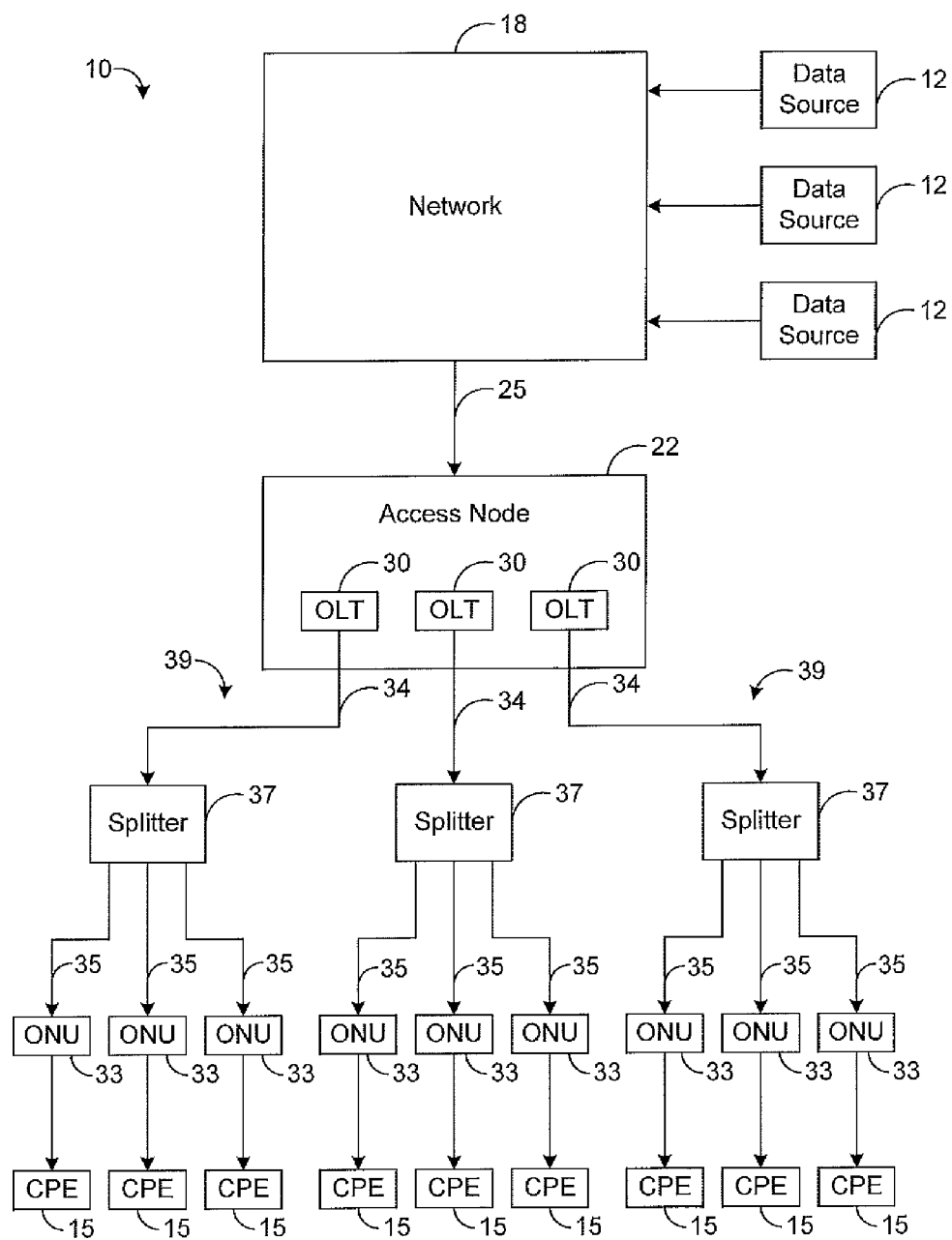
FIG. 1 is a block diagram illustrating an exemplary embodiment of a telecommunication system.

FIG. 1 depicts an exemplary embodiment of a telecommunication system 10 for communicating data from a plurality of data sources 12 to customer premises equipment (CPE) 15 at locations (e.g., customer premises) remote from the data sources 12. In this regard, each data source 12 is coupled to at least one network 18, which can comprise any of various types of networks, such as the public switched telephone network (PSTN), local area networks (LANs), wide area networks (WANs), cellular networks, or the Internet. Note that FIG. 1 shows three data sources 12 for simplicity of illustration, but the system 10 may have any number of data sources 12 and CPE 15.

The network 18 is coupled to an access node 22 via a network connection 25. In one exemplary embodiment, network connection 25 comprises an optical fiber, and the network 18 multiplexes the data streams from multiple data sources 12 into a single data stream for communication across the connection 25. In other embodiments, other types and numbers of network connections may be used for communication between the access node 22 and the network 18. As an example, it is possible for the network connection 25 to be implemented by multiple twisted-wire pairs that are bonded in order to carry a high-speed data stream to the access node 22.

In the downstream direction, the access node 22 is configured to demultiplex the data stream received from the connection 25, thereby separating the data stream into a plurality of demultiplexed packet flows where each packet flow includes packets for a respective service. In this regard, customers subscribe for services, such as Internet service, telephone service, and television service, and each downstream packet flow within the access node 22 generally corresponds to and defines downstream data for a respective service for a respective customer. The packet flows are switched within the access node 22, as will be described in more detail below, such that each packet flow is forwarded to its destination CPE 15.

In this regard, the access node 22 has a plurality of transceivers 30, which in the embodiment shown by FIG. 1 are optical line terminals (OLTs) 30 for communicating optical signals. In other embodiments, other types of transceivers are possible, including transceivers for communicating electrical signals, such as digital subscriber line (DSL) transceivers.

Referring to FIG. 1, each OLT 30 is coupled to a respective set of optical network units (ONUs) 33 via a plurality of communication connections 34, 35, which in the embodiment shown by FIG. 1 are optical fibers. In this regard, each optical fiber 34 is coupled to a respective optical splitter 37 that splits signals from the access node 22 across a plurality of optical fibers 35. Each ONU 33 is configured to receive at least one packet flow from the access node 22 and to convert the received packet flows from the optical domain to the electrical domain. Each OLT 30 and the optical components coupled to it, including the optical splitter 37, ONUs 33, and optical fibers 34, 35 form a passive optical network (PON) 39 for communicating the packet flows via optical signals. In other embodiments, other types of optical channels and non-optical channels may be used to communicate the packet flows between the access node 22 and the CPE 15.

For simplicity of illustration, FIG. 1 depicts only downstream communications, but it is possible for the CPE 15 to transmit upstream data to the access node 22 and network 18, as will be described in more detail hereafter. In addition, FIG. 1 shows three PONs 39 for simplicity of illustration. However, there may be any number of PONs 39, and each PON 39 may have any number of optical components, such as ONUs 33. Indeed, as will be described in more detail hereafter, the access node 22 may have several access modules (not shown in FIG. 1), and any access module may be coupled to and service any number of PONs 39.

Figure 2:
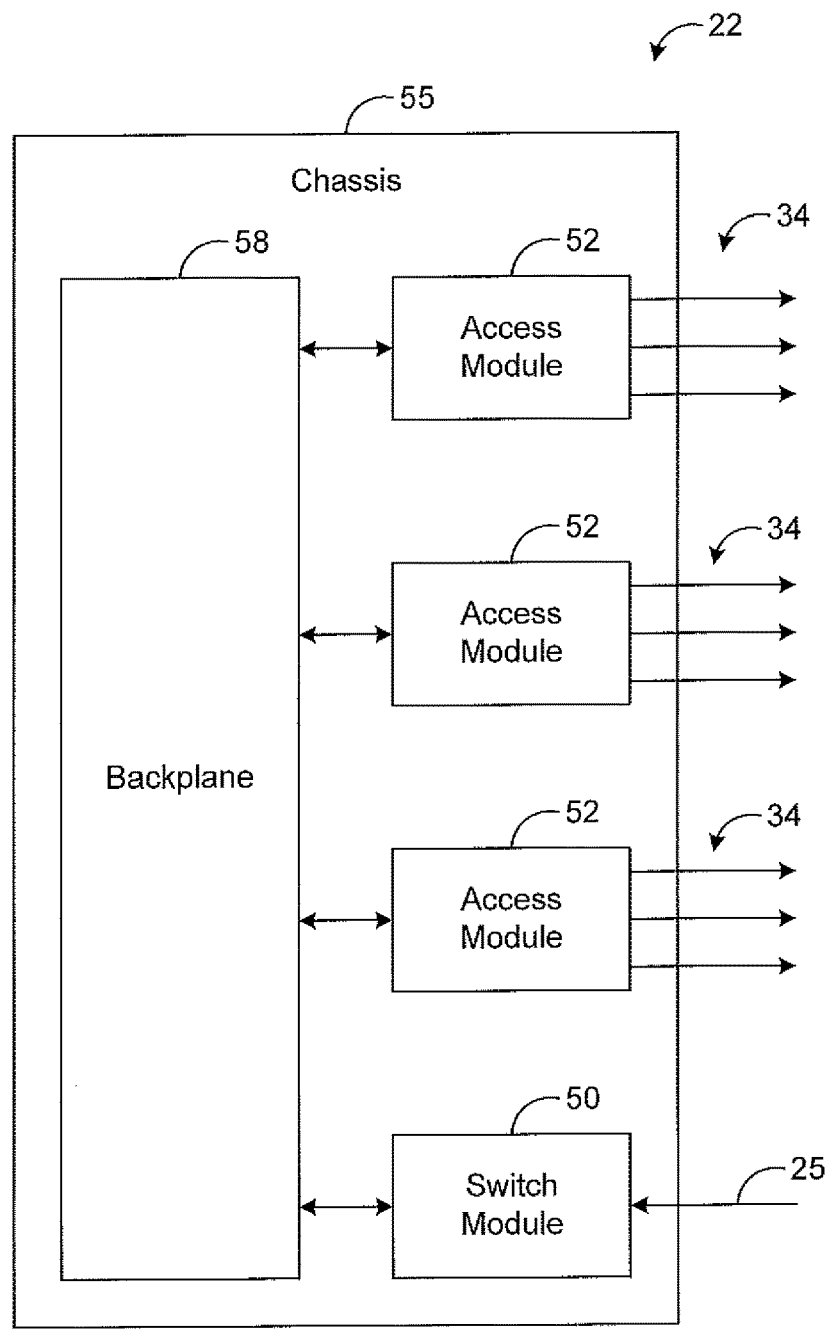
FIG. 2 is a block diagram illustrating an exemplary embodiment of an access node, such as is depicted by FIG. 1.

FIG. 2 depicts an exemplary embodiment of the access node 22. As shown by FIG. 2, the access node 22 comprises a switch module 50 that is coupled to the network connection 25, and the access node 22 also comprises a plurality of access modules 52 that are coupled to optical fibers 34 for communication with the ONUs 33 (FIG. 1). In one exemplary embodiment, each module 50 and 52 is inserted into a respective slot of a chassis 55 at a network facility, such as a central office, or at an intermediate point between a central office and customer premises. As shown by FIG. 2, the chassis 55 has an electrical or optical backplane that electrically or optically couples the access modules 52 to the switch module 50 and to each other. In this regard, any module 50 or 52 may communicate electrical or optical signals with any other module 50 or 52 via the backplane 58. In one exemplary embodiment, backplane implements a star-type switching fabric where the switch modules 50 communicates directly with the access modules 52, and the access modules 52 may communicate with one another through the switch module 50. However, other types of switching fabrics are possible in other embodiments. Note that FIG. 2 shows three access modules 52 and one switch module 50 for simplicity of illustration, but the access node 22 may have any number of access modules 52 or switch modules 50 in other embodiments.

In the downstream direction, the switch module 50 is configured to receive a high-speed data stream from the network 18 (FIG. 1) via the network connection 25. The switch module 50 is configured to demultiplex this high-speed data stream to recover the individual packet flows to be communicated to the CPE 15. The switch module 50 transmits these packet flows across the backplane 50 to the access modules 52 based on their destinations. Specifically, for a given packet flow, the switch module 50 transmits the packet flow to the access module 52 coupled to the CPE 15 that is to receive the packet flow. Such access module 52 converts the packet flow from the electrical domain to the optical domain and then transmits the packet flow across the appropriate optical fiber 34 for reception by the flow's destination CPE 15.

Figure 3:
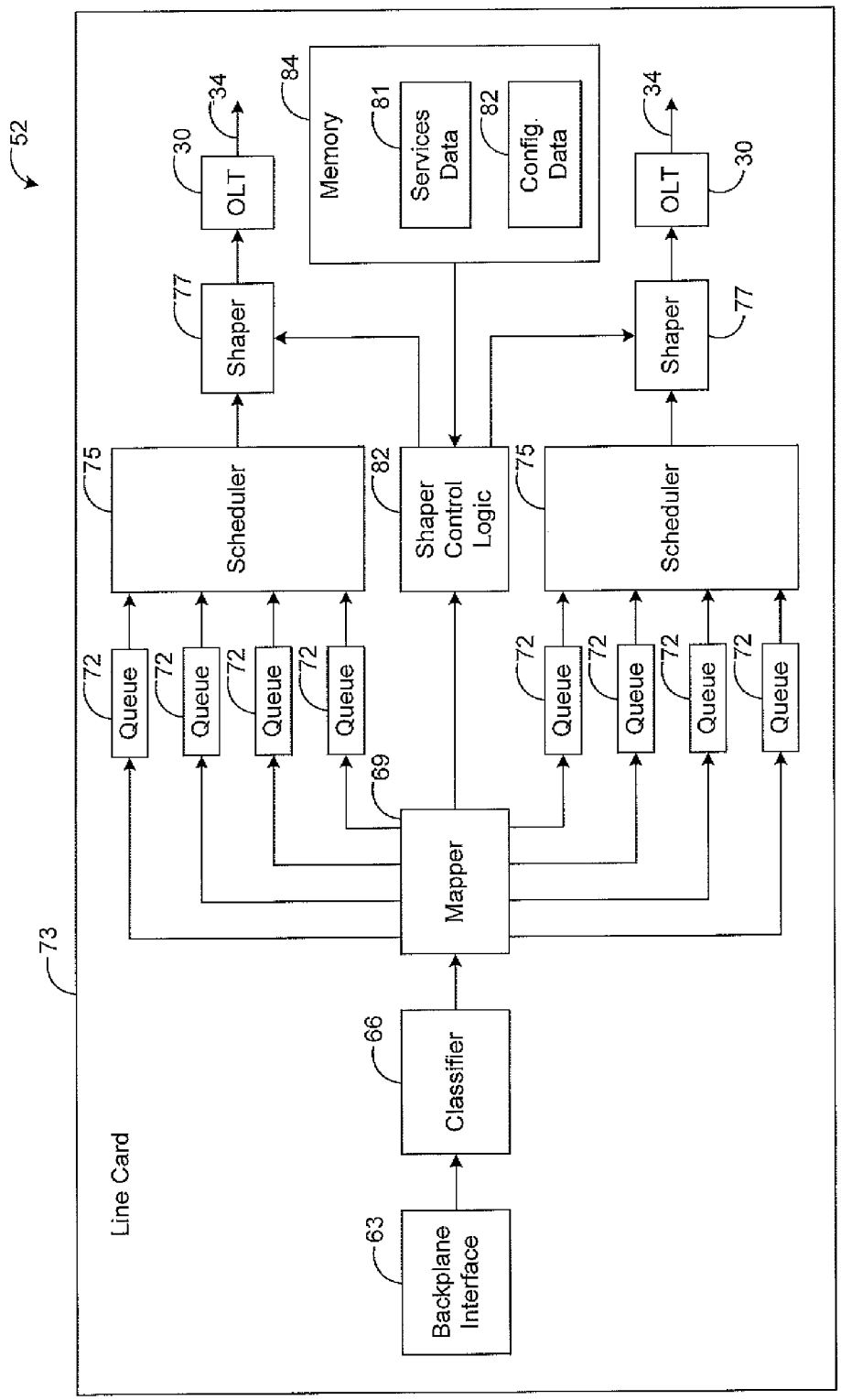
FIG. 3 is a block diagram illustrating an exemplary embodiment of an access module, such as is depicted by FIG. 2, configured for downstream communication.

FIG. 3 depicts an exemplary embodiment of an access module 52. As shown by FIG. 3, the access module 52 has at least one backplane interface 63 that couples the access module 52 to the chassis backplane 58 (FIG. 2). The backplane interface 63 is coupled to a classifier 66 that receives data packets from the switch module 50 (FIG. 2) and classifies such packets. In this regard, as indicated above, the traffic may be associated with different services, and each packet may be classified based on service types or other classification parameters.

The classifier 66 is coupled to a mapper 69 that is configured to map each packet to a respective queue 72 based on the packet's classification, as determined by the classifier 66, and the mapper 69 transmits each packet to the queue 72 to which it is mapped. Note that the packets in the same queue 72 have the same classification. In one exemplary embodiment, each queue 72 corresponds to a respective service of a respective customer or group of customers. That is, all of the packets for a given service are mapped to the same queue 72, but other configurations of the queues are possible in other embodiments.

The queues 72 feeding the same OLT 30 and, thus, ultimately the same PON 39 are coupled to a scheduler 75 that pulls packets from the queues 72 according to a desired scheduling algorithm, which takes into account the priorities and weights assigned to the services and, hence, the queues 72 as known in the art. The output of each scheduler 72 is coupled a respective dynamic shaper 77 that is configured to dynamically control (e.g., limit) the rate of packets passing through it, as will be described in more detail hereafter. The output of each shaper 77 is coupled to a respective OLT 30 that converts the data packets from the shaper 77 into the optical domain from the electrical domain for communication across a respective PON 39 (FIG. 1). Note that all of the components of the access module 52 reside on a printed circuit board (PCB) 73, referred to as a "line card." In other embodiments, other configurations of the access module 52 are possible.

Figure 4:
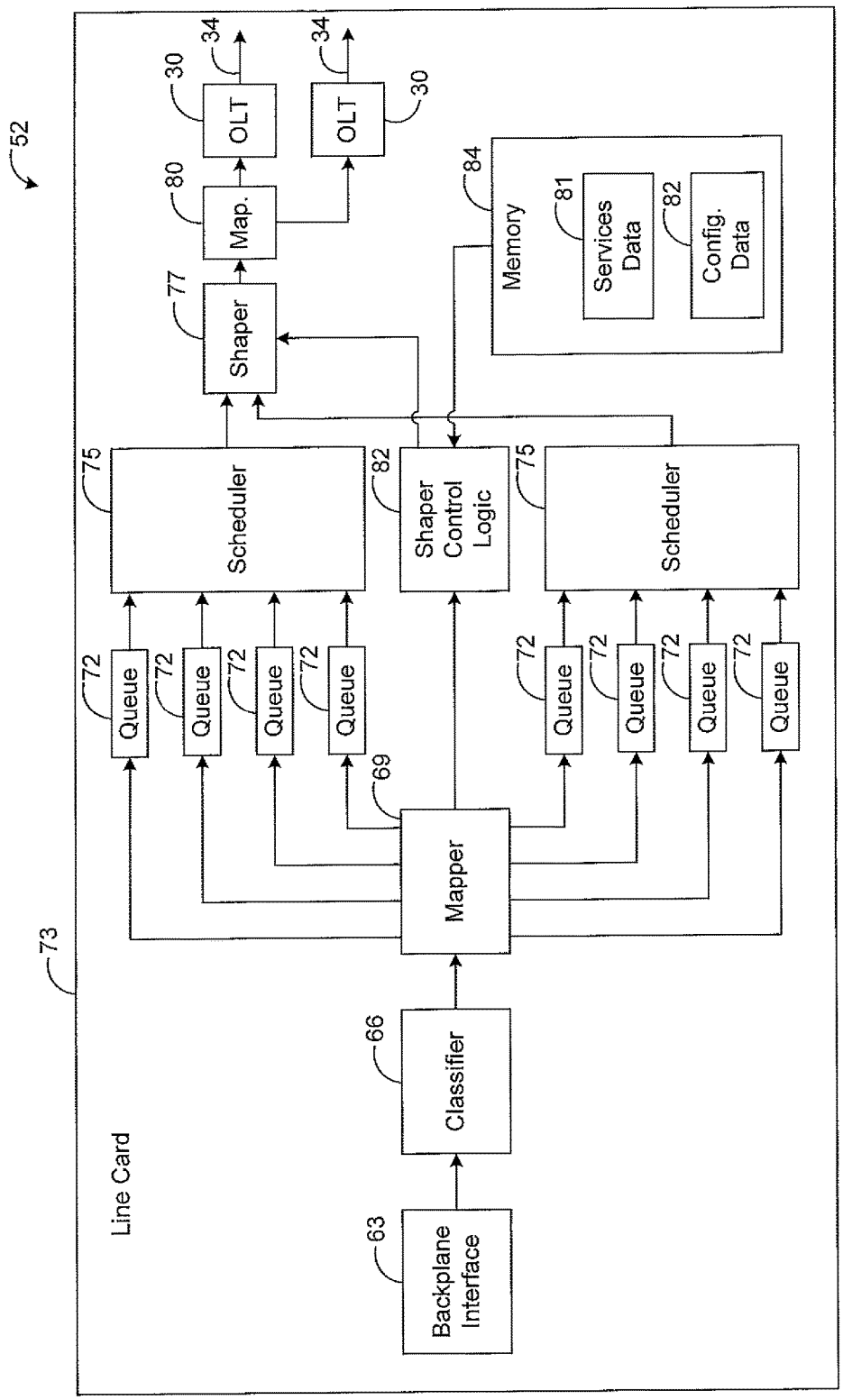
FIG. 4 is a block diagram illustrating another exemplary embodiment of an access module, such as is depicted by FIG. 2, configured to downstream communication.

As an example, as shown by FIG. 4, a scheduler 72 may span across multiple OLTs 30 rather than a single OLT 30, as shown by FIG. 3, such that the scheduler 72 is scheduling traffic for multiple PONs 39. In such case, a single dynamic shaper 77 may limit the rate for all of the PONs 39 served by the scheduler 72, with each packet mapped to the correct OLT 30 by a mapper 80 upon egress from the dynamic shaper 77.

Note that the scheduling hierarchy for a given scheduler 75 may be defined such that the flows from a group of queues 72 for a given user are scheduled. Alternatively, a group of users may be associated with the same queue 72 and, hence, the same service. In addition, as described above, a scheduler 75 may also be configured to schedule traffic for a single PON 37 or, alternatively, a set of PONs 37.

As shown by FIGS. 3 and 4, an access module 52 may comprise shaper control logic 82 that is configured to dynamically control each shaper 77, as will be described in more detail hereafter. In one exemplary embodiment, the shaper control logic 82 is implemented in hardware, such as a field programmable gate array (FPGA). In other embodiments, the shaper control logic 82 may be implemented in hardware, software, firmware, or any combination thereof. As an example, the shaper control logic 82 may be implemented in software that is stored in and executed by a processor (not shown).

The shaper control logic 82 is configured to communicate control information with other access modules 52 across the switching fabric provided by the backplane 58 via a control channel. Specifically, the control logic 82 communicates with the other access modules 52 to discover the traffic load conditions currently at each module 52, referred to as "load information." As an example, the load information may include an estimate of the data rate for the flow of data currently passing through each queue. Such data rate may be estimated based on the amount of data stored in each queue or the amount of data that has recently passed through the queue. In one embodiment, for each queue, the load information indicates the maximum of (1) a data rate that would be required to communicate all of the data currently in the queue over a predefined time period and (2) a data rate measured or otherwise determined for the queue over a recent time interval. In other embodiments, other types of load information are possible.

In one exemplary embodiment, the load information from a given access module 52 is aggregated on a per class-of-service (CoS) basis. That is, for each class of service, the shaper control logic 82 calculates a value indicative of the total amount of data that the access module 52 is currently attempting to communicate (e.g., queued or ingressing to the access module 52 for that class of service). Such information may be determined from the amount of data currently in or passing through the queues associated with such class of service, as described above. In some cases, the aggregated amount may be limited based on predefined constraints (e.g., burst size or rate limitations) associated with the class of service to ensure that the class of service is not oversubscribed with bandwidth. In other embodiments, it is unnecessary for the load information to be aggregated, and other types of aggregation are possible. As an example, rather than sending aggregated load information indicating the loading for each class of service across all PONs serviced by a given access module 52, the load information may be provided on a per-PON basis, or some other basis, indicating the loading for each respective PON serviced by the access module 52.

After receiving current load information for each access module 52, the control logic 82 sets the rate of each dynamic shaper 77 of its access module 52 according to a desired DBA algorithm based on the load information of all of the access modules 52 participating in the DBA algorithm. Each dynamic shaper 77 remains at its updated rate for a given time period, until the control logic 82 receives new loading information from each access module 52 in order to perform another shaper update. Thus, the shaper rates are repetitively updated from time-to-time in order to accommodate changing traffic load conditions. Each access module 52 uses similar techniques to appropriately control its shapers 77 over time in order to implement a desired DBA algorithm that fairly allocates available downstream bandwidth at the access node 22 among the shapers 77, as will be described in more detail hereafter.

In this regard, there may be times when the sum of the loads from data sources 12 exceeds the capacity of the network connection 25. In such case, if shapers 77 are not used to limit the output rates of the access modules 52, packets may be dropped at the network 18. In one exemplary embodiment, the access modules 52, under the control of the shaper control logic 82, are configured to control the rates of the shapers 77 so that the aggregate downstream capacity of all of the access modules 52 is just under the maximum downstream capacity of the connection 25. Thus, packets should be dropped at the access node 22 before a bottleneck develops at the network connection 25, thereby preventing uncontrolled packet loss in the network 18 that would otherwise result from the limited bandwidth associated with the network connection 25. Specifically, as will be described in more detail below, according to certain protocols, loss of packets in an access module 52 is reported as feedback to the data sources 12, which are responsive to such feedback for controlling their respective data rates. As an example, the data rate of a data source 12 may be reduced in response to an increase in packet loss at an access module 52. By appropriately controlling shaper rates in the access modules 52, uncontrolled packet loss at the network 18 can be prevented.

Note that it is unnecessary for each access module 52 to participate in the DBA algorithm that is being used to dynamically control shaper rates. In such an embodiment, it is possible to employ the DBA algorithm only on the participating access modules 52. As an example, assume that some of the access modules 52, referred to hereafter as "participating modules," are configured to participate in the DBA algorithm by dynamically updating shaper rates and sharing load information, as described herein. Also assume that at least some of the access modules 52, referred to hereafter as "non-participating modules," are not configured to participate in the DBA algorithm and, thus, do not dynamically update shaper rates or share load information. In such embodiment, shaper control logic 82 may be configured to dynamically allocate a fraction of the total capacity of the network connection 25 rather than the entire capacity of such connection 25 such that a sufficient amount of capacity is reserved for the non-participating modules.

As an example, assume that the total capacity of the network connection 25 is 20 Giga-bits-per-second (Gbps). Also assume that there are five non-participating access modules 52 that communicate traffic from the network connection 25 and that the maximum downstream rate for each non-participating access module 52 is 100 Mega-bits-per-second. In such example, a total capacity to be allocated among shapers of the participating access modules 52 may be calculated by reducing the total capacity of the network connection 25 by the total maximum downstream capacity of all of the non-participating access modules 52. Thus, in the instant example, the capacity allocated among the schedulers of the participating access modules is 19.5 Gbps (i.e., 20 Gbps-5*100 Mbps) while 500 Mbps is reserved for the non-participating access modules. In such an embodiment, packet loss in the network 18 should be prevented regardless of the actual data rates and loads of the non-participating access modules, assuming that the downstream data rate for each non-participating access module does not exceed its assumed maximum. In other embodiments, other techniques for determining the amount of capacity to be allocated among the shapers of the participating access modules 52 are possible.

Since the shaper control logic 82 is aware of the load information for each access module 52, the shaping algorithm can take into account imbalances in the load information from one access module 52 to another such that a fair allocation of the bandwidth of the access node 22 is applied across all of the access modules 52. For example, for multiple customers who have subscribed for the same service, the shaper control logic 82 can be configured to control the shaper rates according to the DBA algorithm such that each customer should receive the same or similar performance regardless of which PON 39 is used to provide the service to the customer. In another example, the DBA algorithm may weight the flows to provide differentiated performance (e.g., higher data rate), even for flows within the same class of service. In other examples, other techniques to achieve a fair allocation are possible.

As an example, assume that two access modules 52 support twenty services of the same class, each offering a 1 Gigabit per second (Gbps) load, and the connection 25 supports 10 Gbps. In such case, fair allocation would be for each service to be allocated the same rate or 0.5 Gbps. However, assume that nineteen of the services are provided via one access module 52 and that the remaining service (i.e., the "$20^{th}$" service) is provided via another access module 52. Without chassis-wide fairness where allocation is determined based on the load information of both access modules 52, then the lone service on one of the access modules 42 (i.e., the $20^{th}$ service) would be provided at close to 1 Gbps while the other nineteen services are provided less than 0.5 Gbps each. With chassis-wide fairness, the control logic 82 can determine based on the knowledge of the load information for all 20 services that the shaper rates across multiple access modules 52 should be controlled such that each service is provided at about 0.5 Gbps.

In one exemplary embodiment, DBA is performed periodically. For example, the shaper control logic 82 may control the rates of the shapers 77 to achieve a desired DBA based on the traffic load conditions. Thereafter, as traffic load conditions change, the control logic 82 of one access module 52 may be configured to communicate with the other access modules 52 to discover how the traffic load conditions have changed and to then update the DBA accordingly.

In one exemplary embodiment, the shaper control logic 82 of each access module 52 uses the same DBA algorithm in order to determine the shaper rates for the shapers 77 of its access module 52 (referred to as the shaper control logic's "local" access module) based on the traffic load conditions of all of the access modules 52. Based on the traffic load conditions of its local access module 52, as well as the other access modules 52, the shaper control logic 82 is configured to determine how much of the overall downstream bandwidth available for the access node 22 is to be allocated to its local access module 52 on a per-shaper basis so that the available downstream bandwidth is fairly allocated among the shapers of all of the access modules 52. The shaper control logic 82 then adjusts the shaper rates of the shapers 77 on its local access module 52 according to the determined allocation. By performing such techniques at each access module 52, the allocation of available downstream bandwidth is performed in a fair manner across all access modules 52 such that services of the same class achieve a desired (e.g., same or similar) performance regardless of which access module 52 handles the packet flows of such services.

The DBA algorithm implemented by the shaper control logic 82 may be based on many factors. In one exemplary embodiment, the DBA algorithm is based on services data 81 and configuration data 82 that are stored in memory 84 of the access module 52. The configuration data 82 is indicative of the configuration and, more specifically, the capacity of the system 10, such as the configuration of the access node 22 and the PONs 39. As an example, for the downstream direction, the configuration data 82 may indicate the number of queues 72, queue size, and classification and mapping parameters for one or more access modules 52. The configuration data 81 may also include configuration information about the PONs 39 serviced by the access module 52, such as the number of OLTs 30 residing on the module 52, the number of ONUs 33 serviced by each OLT 30, and the number and types of services carried by each PON 39. The services data 81 includes parameters indicative of the services associated with one or more access modules 52, such as the guaranteed and peak rates, weight, and priority associated with each service. Note that the services data 81 and configuration data 82 may be provisioned by a technician or otherwise defined prior to operation of the access node 22.

In one exemplary embodiment, the services data 81 and the configuration data 82 indicate detailed information about the resources associated with the same access module 52 on which the data 81, 82 is stored but indicates coarser information for the other access modules in the access node 22. As an example, the services data 81 and the configuration data 82 of a given access module 52 may indicate, respectively, the service level parameters and resource capacity for each packet flow of this access module. However, the services data 81 indicates aggregated parameters on a per class-of-service basis for each of the other access modules 52. For example, for a particular access module 52, the configuration data 82 may indicate the total number of services of a particular class without indicating the number of PONs or without indicating which PON carries which service. Also, the services data 81 may indicate an aggregate performance parameter (e.g., minimum average data rate, maximum data rate, etc.) for a particular class of services without indicating the same parameter for each individual service of that class. In other embodiments, other types of information may be stored in the services data 81 and the configuration data 82. As an example, it is possible for the service data 81 and the configuration data 82 to indicate detailed information about each packet flow passing through the access node 22 regardless of which access module 52 services the flow.

As described above, the DBA algorithm used to control the shapers 77 sets the shaper rates such that that the aggregate downstream data rate of all of the access modules 52 is limited to just below the maximum downstream data rate of the network connection 25 thereby preventing uncontrolled packet loss at the input of the network connection 25 due to congestion. As an example, in one embodiment, the shaper rates are set such that the aggregate downstream data rate through the access node 22 is set to be as high as possible while remaining below the maximum downstream data rate of the network connection 25 within a desired margin of error. Further, the DBA algorithm effectively forces packet losses resulting from congestion into the individual queues 72 so that packet loss can be controlled on a per-queue and, hence, per-service basis where each queue 72 corresponds to a respective service. Accordingly, the data rate for each service can be individually controlled via the DBA algorithm that is implemented by the shaper control logic 82 via the scheduling and the shaping performed by the schedulers 75 and the shapers 77, respectively, of the access modules 52.

In this regard, through transmission control protocol (TCP) or other known protocols, a data source 12 (FIG. 1) controls transmission rates based on feedback indicative of packet loss. As an example, as is known in the art, when a packet is lost, a control message indicative of the packet loss, such as a duplicate Acknowledgement packet, may be transmitted to the data source 12 from which the lost packet originated. Thus, when the rate of a shaper 77 is reduced, more packets are lost in the packet flows passing through the queues 72 feeding the shaper 77 such that the data sources 12 reduce the data rates of these packet flows in response to feedback indicative of an increase in packet loss. Conversely, when the rate of a shaper 77 is increased, less packets are lost in the packet flows passing through the queues 72 feeding the shaper 77 such that the data sources 12 may increase the data rates of these packet flows. Thus, adjusting the rates of the shapers 77 has the effect of adjusting the transmission rates of the packets flows passing through the shapers 77. Accordingly, using the knowledge of the load information for all of the access modules 52, it is possible to control the shapers 77 so that the data rates of the packet flows are controlled in a fair manner so that, for example, the customers having similar services receive similar performance.

An exemplary operation and use of the system 10 for establishing the shaper rates for an access module 52, referred to hereafter as "Access Module A," will now be described in more detail below with reference to FIG. 5.

Figure 5:
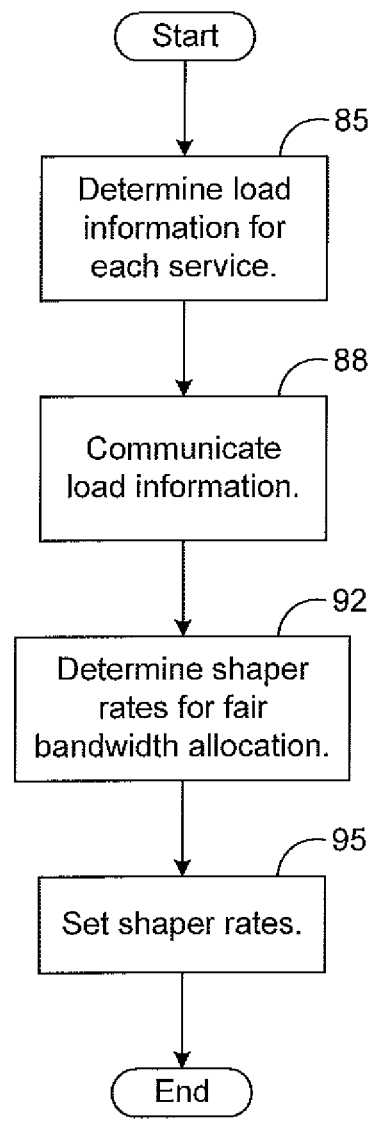
FIG. 5 is a flowchart illustrating an exemplary method for setting shaper rates for controlling downstream bandwidth in a desired manner.

As shown by block 85 of FIG. 5, downstream load information for each service is determined. In this regard, the shaper control logic 82 of Access Module A is configured to determine a value indicative of an amount of downstream data that is currently being communicated for each packet flow that is serviced by Access Module A. As described above, there are various techniques that may be performed to effectuate such an estimate. As an example, the shaper control logic 82 may determine the load conditions based on the amount of data currently stored in or passing through the queues.

In order to reduce the amount of data communicated across the backplane 58, the shaper control logic 82 of Access Module A aggregates the downstream load information of this Access Module A on a per-CoS basis. Thus, for each respective class of service, the shaper control logic 82 calculates an aggregated value indicating the total amount of downstream data that Access Module A is currently communicating for the class of service. When aggregating the downstream load information, the shaper control logic 82 limits the subtotals at appropriate points to the loads that can be carried by each element in the system, such as each PON 39. The shaper control logic 82 of Access Module A transmits this aggregated load information to each of the other access modules 52 via a control channel of the backplane 58, as shown by block 88 of FIG. 5. The shaper control logic 82 of the other access modules 52 similarly determines and distributes across the backplane 58 in block 88 load information that is aggregated on a per-CoS basis so that each access module 52 is aware of the aggregated load information of all of the access modules 52. Thus, the shaper control logic 82 of Access Module A is aware of the downstream load information for each packet flow serviced by Access Module A, as well as the aggregated downstream load information for each of the other access modules 52. That is, for each of the other access modules 52, the shaper control logic 82 is aware of the aggregated amount of downstream data that the access module 52 is currently communicating per class-of-service.

Based on aggregated downstream metrics, such as downstream load information and weights aggregated on a per-CoS basis, the shaper control logic 82 of Access Module A determines a fair allocation of the available downstream bandwidth for each shaper 77 contained within Access Module A, as indicated by block 92 of FIG. 5. Specifically, the control logic 82 determines the shaper rates such that the aggregate downstream data rate through each shaper is limited to that amount allocated to it according to the DBA algorithm. Note that the shaper rate for any of the shapers 77 of Access Module A may be based on a variety of factors, such as the priorities or weights assigned to the packet flows passing through the shapers 77 (as indicated by the services data 81), the amount of data currently communicated for such packet flows, the types of algorithms to be used for handling congestion (as indicated by services data 81), and other information typically used to select desired shaper rates.

After determining the desired shaper rates, the shaper control logic 82 of Access Module A controls the shapers 77, as indicated by block 95 of FIG. 5, in order to implement the determined shaper rates. The shapers 77 operate according to such shaper rates until these shaper rates are later readjusted by the shaper control logic 82 using the method depicted by FIG. 5 based on changed conditions. In this regard, the DBA logic 101 may update the shaper rates periodically or according to some other algorithm in order to account for changing traffic load conditions.

Note that the shaper control logic 82 of each access module 52 similarly allocates a portion of the available downstream bandwidth to its local shapers 77 and then controls the shaper rates of its local shapers 77 accordingly. In allocating downstream bandwidth, the shaper control logic 82 of each access module 52 may use the same DBA algorithm so that the calculations are consistent from module-to-module. Thus, each access module 52 is aware of the amount of downstream bandwidth that is fairly allocated to each of the other access modules 52.

As described above, the access modules 52 control the shaper rates according to the DBA algorithm so that the total downstream data rate is limited to a value just below the total downstream capacity of the access node 22. That is, the total downstream data rate for the access node 22 is limited to a value just below the maximum total downstream data rate provided by the network connection 25 that is feeding the access node 22. Thus, to the extent that packets are lost due to congestion, such losses should occur in the queues 72 at the access node 22. Accordingly, the shaper control logic 82 is configured to control the shapers 77 so that the total downstream bandwidth of the access node 22 is allocated fairly among the dynamic shapers 77. Indeed, rather than allocating the downstream bandwidth among the dynamic shapers 77, the downstream bandwidth is allocated so that flows of the same class of service are allocated in a fair manner. As an example, the flows of the same class of service may be allocated the same bandwidth and, hence, have the same or similar data performance regardless of which access module 52 actually communicates the flow and regardless of which PON 39 actually carries the flow.

Note that, in the embodiments described above, the shaper control logic 82 for implementing a desired DBA algorithm is distributed across the access modules 52 such that each access module 52 determines its respective shaper rates. However, if desired, the shaper control logic 82 may be implemented at a central location, such as any one of the access modules 52 or the switch module 50. In such embodiment, the "centralized" shaper control logic 82 communicates with each access module 52 across the chassis backplane 58 via a control channel in order to determine the traffic load conditions at each access module 52. The shaper control logic 82 then determines the amount of downstream bandwidth allocated to each access module 52 so that the available downstream bandwidth is allocated in a fair manner across all of the access modules 52. The shaper control logic 82 then communicates with each access module 52 so that the shapers 77 are appropriately controlled to limit packet flow, as described above.

Figure 6:
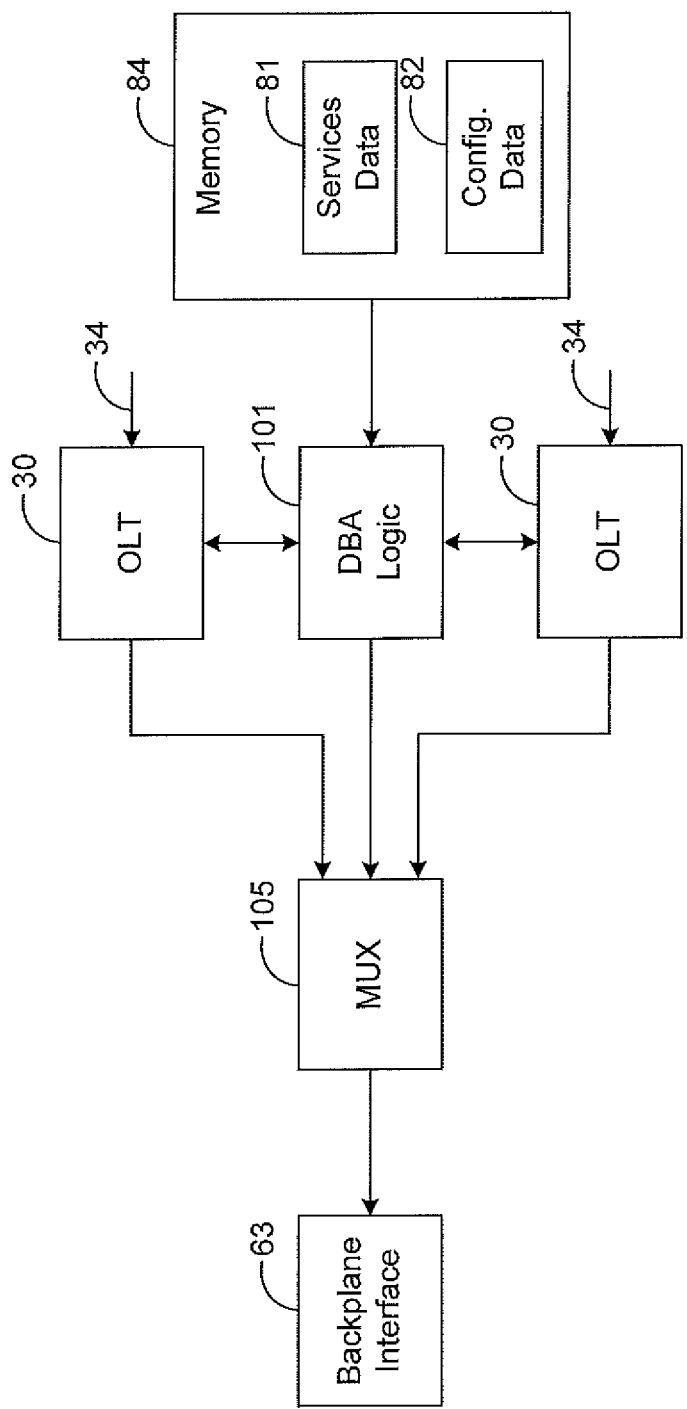
FIG. 6 is a block diagram illustrating an exemplary embodiment of an access module, such as depicted by FIG. 2, configured for upstream communication.

FIG. 6 depicts an exemplary embodiment of an access module 52 showing various components used to process upstream data. As shown by FIG. 6, each OLT 30 is coupled to a multiplexer (MUX) 105. When packets are received by an OLT 30 from an optical fiber 34, the OLT 30 converts the packets from the optical domain to the electrical domain and transmits the converted packets to the multiplexer 105, which multiplexes the data streams from multiple OLTs 30 to form a combined data stream for transmission across the chassis backplane 58 to the switch module 50. The switch module 50 combines data streams from multiple access modules 52 to form a combined data stream for transmission across the network connection 25 to the network 18 (FIG. 1). In one exemplary embodiment where the network connection 25 is an optical fiber, the switch module 50 also converts the combined data stream from the electrical domain to the optical domain so that the combined data stream is optically communicated via the network connection 25.

In the upstream direction, logic 101 (FIG. 6), referred to hereafter as "DBA logic," is configured to control bandwidth allocation. In one exemplary embodiment, the DBA logic 101 is implemented in hardware, such as a field programmable gate array (FPGA). In other embodiments, the DBA logic 101 may be implemented in hardware, software, firmware, or any combination thereof. As an example, the DBA logic 101 may be implemented in software that is stored in and executed by a processor (not shown).

As will be described in more detail below, the DBA logic 101 is configured to communicate with the OLTs 30 in order to control upstream bandwidth allocation. In this regard, via known techniques, each OLT 30 is configured to communicate with the ONUs 33 (FIG. 1) of the same PON 39 via a control channel in order to control upstream transmissions, such as when each ONU 33 is permitted to transmit. As will be described in more detail hereafter, the DBA logic 101 is configured to determine the amount of upstream bandwidth allocated to each service based on the upstream traffic load conditions across all of the access modules 52 and to then communicate control information with each OLT 30 for appropriately setting the upstream data rate of each service in order to achieve the desired bandwidth allocation. Based on such control information, each respective OLT 30 is then configured to communicate control information with the ONUs 33 so that the packet flows sent by the ONUs 33 are at the appropriate rates to implement the desired upstream bandwidth allocation.

In order to determine the appropriate bandwidth allocation for each service, the DBA logic 101 of a given access module 52 is configured to communicate with other access modules 52 across the chassis backplane 58 via a control channel, similar to the shaper control logic 82 described above. Through such communication, the DBA logic 101 is configured to receive control information indicating the current traffic load conditions in the upstream direction for all of the access modules 52. Note that such information may be obtained from the ONUs 33. That is, for a PON 39, the PON's OLT 30 may communicate with the ONUs 33 via a control channel of the PON 39 or otherwise in order to learn the traffic load conditions at each ONU 33. If the ONUs 33 are not configured to communicate such traffic load information with the OLT 30, the OLT 30 may be configured to infer the current load conditions based on the traffic flows and the control information that is passed between the OLT 30 and ONUs 33. Such information may be aggregated and limited, and is transmitted across the backplane 58 to the other access modules 52, such that the DBA logic 101 of each access modules 52 is aware of the traffic load conditions in the upstream direction for all of the access modules 52. Based on such load conditions, the DBA logic 101 fairly allocates the upstream bandwidth of the access node 22 across all access modules 52 such that services of the same class achieve a desired (e.g., same or similar) performance, as described above for the downstream direction. That is, rather than allocating the upstream bandwidth among the access modules 52 equally, each access module 52 is allocated a respective portion of the overall upstream bandwidth depending on its resources and the packet flows that are being communicated by the access module 52.

As shown by FIG. 6, the DBA logic 101 has access to the service data 81 and the configuration data 82 stored in memory 84. As indicated above, the configuration data 81 may indicate configuration information about the OLTs 30 and the PONs 39 serviced by the OLTs 30. For the upstream direction, the services data 81 may indicate various parameters, such as the guaranteed and peak rates, weight, and priority associated with each service. As indicated above for the downstream direction, the parameters may be indicated per flow. Alternatively, it is possible for the parameters to be indicated per flow locally but aggregated for other access modules 52, as described above for the downstream direction. Based on the traffic load conditions and the performance parameters, the DBA logic 101 determines how much upstream bandwidth is allocated to each access module 52. Based on the amount upstream bandwidth allocated to a given access module 52, as well as the module's configuration and performance metrics indicated by the services data 81 and the configuration data 82, the module's DBA logic 101 calculates a maximum upstream data rate for each packet flow such that the module's upstream bandwidth is fairly distributed across the module's packet flows.

After determining the upstream rate for each packet flow serviced by a given access module 52, the module's DBA logic 101 communicates the module's upstream rates to the module's OLTs 30, and these OLTs 30 then communicate with the ONUs 33 via PON control channels or otherwise in order to effectuate the determined rates. In particular, for a given PON 39, the PON's OLT 30 controls when each ONU 33 is permitted to transmit upstream such that the maximum upstream rate for a particular packet flow is limited according to the calculations performed by the DBA logic 101. Further, the DBA algorithm used to allocate upstream bandwidth ensures that the total upstream rate of the access node 22 is set just below the overall upstream capacity of the network connection 25 within a desired margin of error.

An exemplary operation and use of the system 10 for establishing the upstream rates for an access module 52, referred to hereafter as "Access Module B," will now be described in more detail below with reference to FIG. 7.

Figure 7:
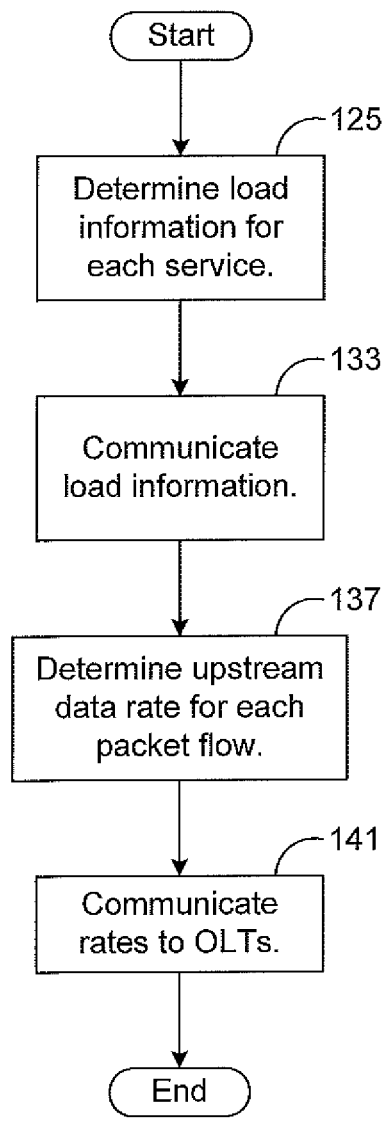
FIG. 7 is a flowchart illustrating an exemplary method for communicating control information with OLTs, such as is depicted by FIG. 6, in order to control upstream bandwidth in a desired manner.

As shown by block 125 of FIG. 7, load information for each service is determined. In this regard, for each PON 33, the PON's OLT 30 may be configured to communicate with the PON's ONUs 33 via a control channel of the PON 39 or otherwise to learn the current upstream load conditions, such as the amount of upstream data that is currently requested for transmission to the OLT 30 for each service or packet flow. The DBA logic 101 of Access Module B is configured to communicate with the OLTs 30 of Access Module B to learn the traffic load conditions in the upstream direction for the PONs 39 serviced by Access Module B. As an example, the DBA logic 101 may determine a value indicative of an amount of upstream data that is currently requested for each packet flow that is serviced by Access Module B. The DBA logic 101 of the other access modules 52 similarly determine the upstream load information of each packet flow serviced by these access modules.

In one exemplary embodiment, in order to reduce the amount of data communicated across the backplane 58, the DBA logic 101 of Access Module B aggregates the upstream load information of this Access Module B on a per-CoS basis, as described above for the downstream load information. Thus, for each class of service, the DBA logic 101 is configured to determine an aggregated value indicating the total amount of upstream data that is currently requested by Access Module B for the class of service. The DBA logic 101 transmits this aggregated load information to each of the other access modules 52 via a control channel of the backplane 58, as shown by block 133 of FIG. 7. The DBA logic 101 of the other access modules 52 similarly determine load information and distribute aggregated load information across the backplane 58 in block 133 so that each access module 52 is aware of the aggregated upstream load information of all of the access modules 52. Thus, the DBA logic 101 of Access Module B is aware of the upstream load information for each packet flow serviced by Access Module B, as well as load information that has been aggregated on a per-CoS basis for each of the other access modules 52. That is, for each of the other access modules 52, the DBA logic 101 is aware of the aggregated amount of upstream data that is currently requested for each class of service communicated by that access module 52.

Based on aggregated metrics, such as upstream load information and upstream parameters that have been aggregated on a per-Cos basis, the DBA logic 101 of Access Module B determines a fair allocation of the available upstream bandwidth of the access node 22 for each access module 52. Based on the upstream bandwidth allocated for Access Module B and more detailed metrics, such as upstream load information and upstream performance minimums indicated for each flow communicated by Access Module B, the DBA logic 101 of Access Module B then determines maximum upstream rates for its packet flows, as indicated by block 137 of FIG. 7, such that the aggregate upstream data rate through Access Module B is limited to that amount that has been allocated to it according to the DBA algorithm. Note that the upstream rate for any of the packet flows of Access Module B may be based on a variety of factors, such as the priorities or weights assigned to the packet flows (as indicated by the services data 81), the amount of data currently requested by such packet flows, the types of algorithms to be used for handling congestion (as indicated by services data 81), and other information typically used to select desired upstream rates.

After determining the upstream rates, the DBA logic 101 of Access Module B communicates the upstream rates to the OLTs 30 of the same Access Module B, as shown by block 141 of FIG. 7. The OLTs 30 then control the ONUs 33 so that the upstream data for each packet flow is limited according to the upstream rates calculated by the DBA logic 101. The upstream rates are so limited until the DBA logic 101 later updates the upstream rates in order to accommodate changing traffic load conditions by again performing the method depicted by FIG. 7. In this regard, the DBA logic 101 may update the upstream rates periodically or according to some other algorithm in order to account for changing traffic load conditions.

Note that the DBA logic 101 of each access module 52 similarly allocates a portion of the available upstream bandwidth to its access module 52 and then controls the rates of upstream data received by its local OLTs 30 accordingly. In allocating upstream bandwidth, the DBA logic 101 of each access module 52 may use the same DBA algorithm so that the calculations are consistent from module-to-module. Thus, each access module 52 may be aware of the amount of upstream bandwidth that is fairly allocated to each of the other access modules 52.

In any event, the access modules 52 control the upstream rates according to the DBA algorithm so that the total upstream data rate across all of the access modules 52 is limited to a value just below the total upstream capacity of the network connection 25. That is, the total upstream data rate for the access node 22 is as high as possible while ensuring that it remains, within a desired margin of error, just below the maximum total upstream data rate provided by the network connection 25.

As described above for the shaper control logic 82, it is unnecessary for the DBA logic 101 to be distributed across the access modules 52. For example, if desired, the DBA logic 101 may be implemented at a central location, such as any one of the access modules 52 or the switch module 50. In such embodiment, the "centralized" DBA logic 101 communicates with each access module 52 across the chassis backplane 58 via a control channel in order to determine the load conditions at each access module 52. The DBA logic 101 then determines the amount of upstream bandwidth allocated to each access module 52 so that the available bandwidth is allocated in a fair manner across all of the access modules 52. The DBA logic 101 then communicates with each access module 52 so that the OLTs 30 are informed how to limit upstream transmissions.

In addition, in various embodiments described above, the access modules 52 are described as sharing aggregated load information and using aggregated performance metrics to allocate upstream and downstream bandwidth. Using aggregated load information and performance metrics generally simplifies calculations and helps to reduce the amount of data that is communicated cross the backplane 58. However, it should be emphasized that it is unnecessary for the load information or the performance metrics to be aggregated in any of the embodiments described herein. As an example, more detailed information (e.g., load information on a per-service basis) may be shared across the backplane 58 and used to allocate downstream or upstream bandwidth. Other modifications and changes would be apparent to a person of ordinary skill upon reading this disclosure.

Figure 8:
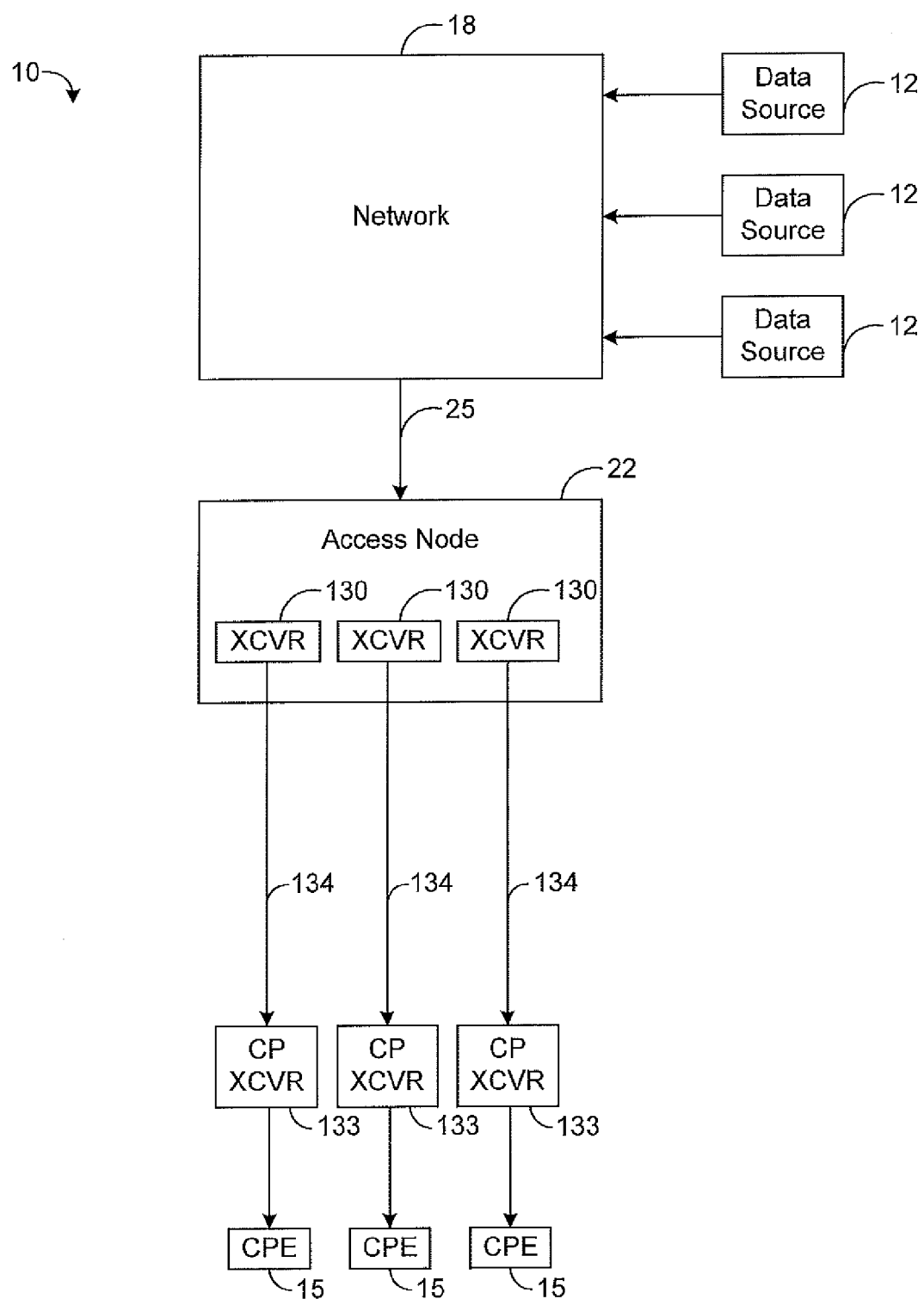
FIG. 8 is a block diagram illustrating an exemplary embodiment of a telecommunication system.

It should be further noted that various techniques may be used for communicating between the access node 22 and the CPE 15. As an example, FIG. 8 depicts an exemplary embodiment of a system 10 in which the access node 22 has electrical transceivers (XCVR) 130. In this regard, each electrical transceiver 130 is coupled to a customer premises transceiver (CP XCVR) 133 via a respective communication connection 134. In one exemplary embodiment, the transceivers 130, 133 communicate via DSL (e.g., asymmetric DSL (ADSL), high-bit-rate DSL (HDSL), very-high-bit-rate DSL (VDSL), VDSL2, or any of the other flavors of DSL) or other known protocol. If desired, multiple communication connections 134 may be aggregated (e.g., bonded) in order to define a single virtual channel, as known in the art. The access node 20 in the embodiment depicted by FIG. 8 operates essentially the same as the access node 20 depicted by FIG. 1 except that electrical signals rather than optical signals are communicated between the access node 22 and the equipment at the customer premises.

Figure 9:
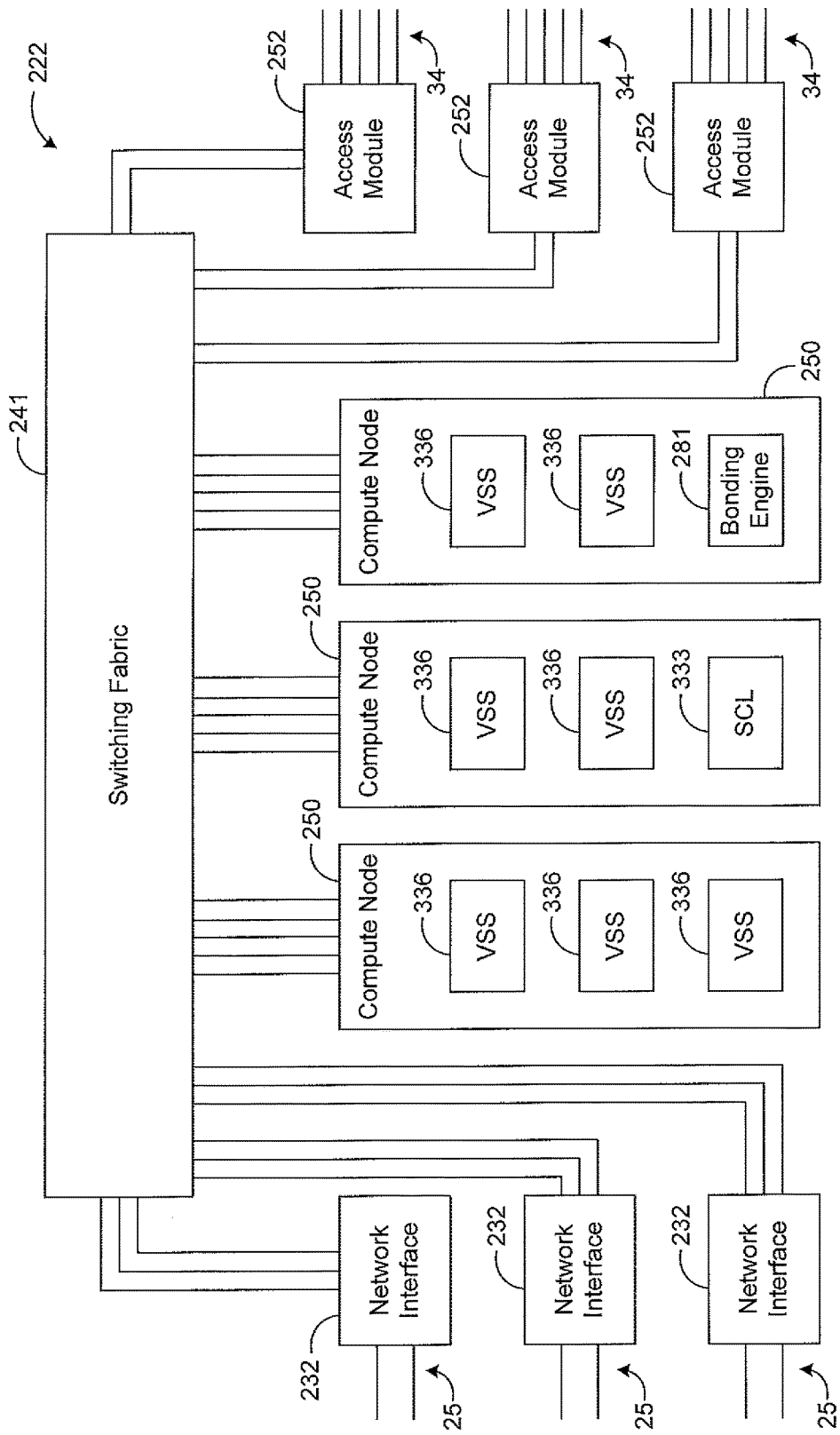
FIG. 9 is a block diagram illustrating an exemplary embodiment of part of an access network.

FIG. 9 depicts an exemplary embodiment of an access network 222 in which various components, such as schedulers and shapers, are implemented in software. Like the access node 22 of FIG. 2, the access network 222 of FIG. 9 contain elements that use an allocation algorithm based on current load conditions in order to achieve a fair allocation of network bandwidth for one or more access interfaces. In the exemplary access node 22 depicted by FIG. 2, the network connection 25 represents a congestion point from which packet flows passing through the congestion point may be distributed across a plurality of access modules 52. As described above, network bandwidth through the congestion point at the network connection 25 is fairly allocated so that services of the same class passing through the congestion point achieve a desired (e.g., same or similar) performance regardless of which access modules 52 communicate the services. In the embodiment depicted by FIG. 9, a congestion point may exist at an access module 252 (such as at an OLT on an access module) where flows from multiple network connections 25 may pass through the same congestion point. Network bandwidth through the congestion point of an access module 252 may be fairly allocated so that services of the same class passing through the congestion point achieve a desired (e.g., same or similar) performance, as described above for the congestion point of the network connection 25 in the embodiment depicted by FIG. 2.

The exemplary embodiment shown by FIG. 9 may be used to implement a virtualized network architecture in which various functions, such as mapping, scheduling, and shaping, run as virtual functions on compute nodes 250 and are instantiated as needed. As shown by FIG. 9, the access network 222 comprises at least one network interface 232 where each network interface 232 is coupled to at least one network connection 25. Each network interface 232 has one or more ports for receiving packet flows from one or more network connections 25 coupled to it and forwards such packet flows to a switching fabric 241. As an example, each network interface 232 may be implemented as a router or switch that is coupled between the network connections 25 and the switching fabric 241, which comprises one or more switches for switching traffic among a plurality of compute nodes 250, as will be described in more detail hereafter. The switching fabric 241 is also coupled to a plurality of access modules 252, which receive packet flows from the switching fabric 241 and communicate the packet flows across the communication connections 34, as will be described in more detail below.

Figure 10:
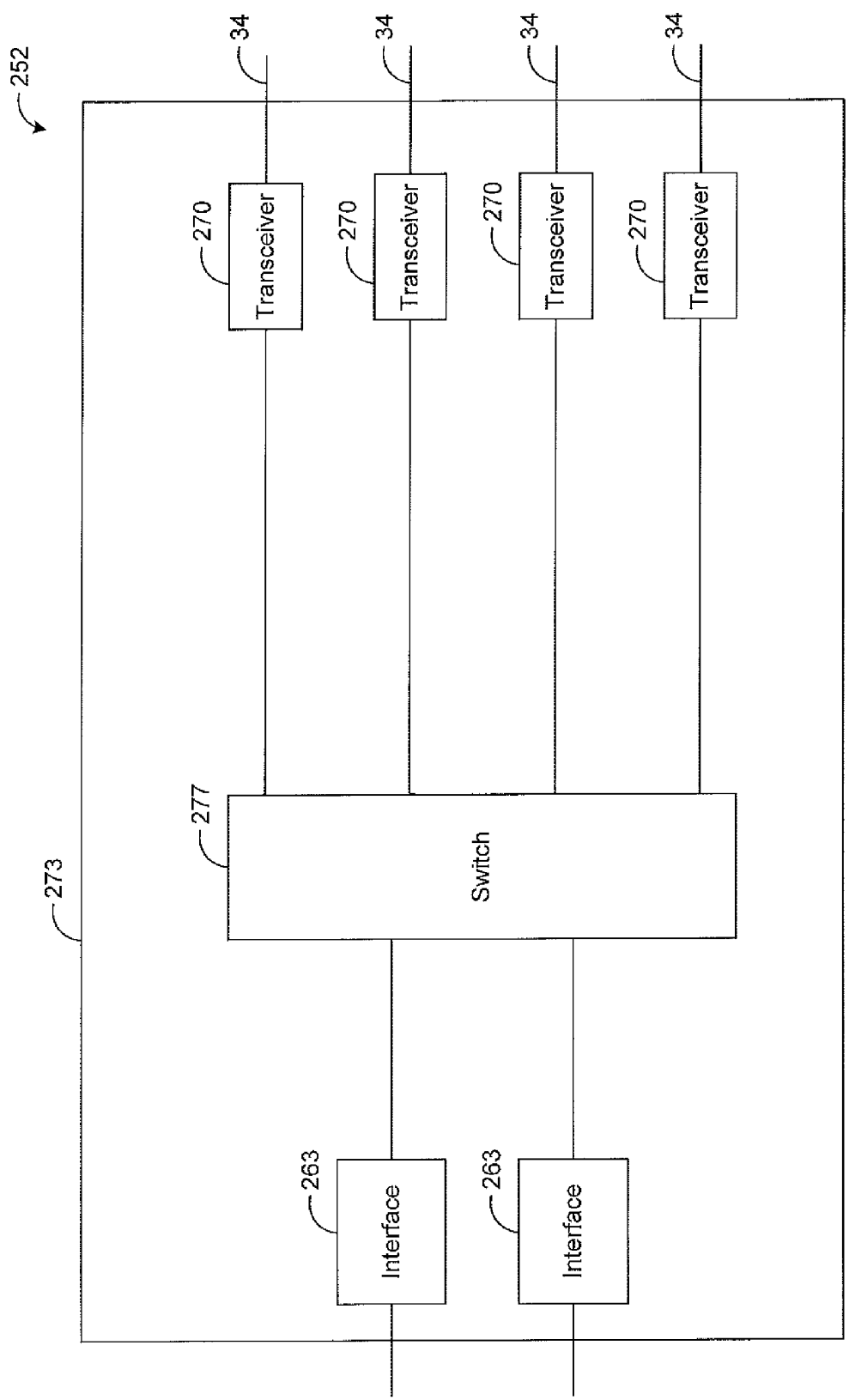
FIG. 10 is a block diagram illustrating an exemplary embodiment of an access module, such as is depicted by FIG. 9.

FIG. 10 depicts an exemplary embodiment of an access module 252. As shown by FIG. 10, the access module 252 has at least one interface 263 that couples the access module 252 to the switching fabric 241 (FIG. 9). The exemplary access module 252 of FIG. 10 shows two interfaces 263, but the access module 252 may have any number of interfaces 263 in other embodiments. Like the access modules 52 described above, the access module 252 shown by FIG. 10 has a plurality of transceivers 270 respectively coupled to a plurality of communication connections 34. As described above and shown by FIG. 1, the communication connections 34 may be coupled to CPE 15 and carry traffic between the access module 252 and the CPE 15 at one or more customer premises. As an example, a transceiver 270 may be implemented as an OLT for communicating optical signals across a PON between the access module 252 and the CPE 15 at one or more customer premises. In other examples, other types of transceivers 270 are possible, including transceivers for communicating electrical signals, such as DSL transceivers.

As shown by FIG. 10, the access module 252 may have at least one switch 277 that is coupled between the transceivers 270 and the interfaces 263. The switch 277 is configured such that any traffic received in the downstream direction from the switching fabric 241 through any interface 263 or otherwise may be transmitted to any transceiver 270. In the upstream direction, any traffic received from any transceiver 270 may be transmitted through at least one interface 263 or otherwise to the switching fabric 241. Note that all of the components of the access module 252 may reside on a printed circuit board (PCB) 273. In other embodiments, other configurations of the access module 252 are possible. As an example, it is possible to implement an access module 252 without the use of a switch 277. In such example, each transceiver 270 may be coupled through a respective interface 263 to the switching fabric 241 so that switching on the access module 252 is unnecessary.

Note that each transceiver 270 provides an access point to which communication devices external to the network 222 connect for obtaining network access. Multiple packet flows pass through each transceiver 270, and congestion may occur at each transceiver 270, which may be a congestion point within the access network 222. As an example, the communication rate of a transceiver 270 may be less than the rates at which other components of the access network 222, such as the switching fabric 241, are capable of communicating data for paths passing through the transceiver 270 such that congestion and packet loss may occur at a given transceiver 270 if steps are not taken to control the rate at which traffic is transmitted to the transceiver 270. As an example, if an OLT is used to implement a transceiver 270, the OLT may be a downstream congestion point as the PON over which the OLT communicates uses a protocol having a defined communication rate. In such case, the switching fabric 241 may be able to transmit packets to the OLT faster than the OLT can output packets onto a communication connection 34 (e.g., an optical fiber) such that the OLT is a congestion point within the access network 222.

In some cases, a group of transceivers 270 may be a congestion point. As an example, any of the compute nodes 250 may have a bonding engine 281 that bonds multiple communication connections 34. In this regard, using known bonding techniques, the bonding engine 281 may fragment packets of a flow into a plurality of fragments and then transmit the fragments to multiple transceivers 270 (referred to hereafter as "bonded transceivers"), which then communicate the fragments across multiple communication connections 34 such that the total rate at which all of the bonded transceivers 270 can communicate the flow is greater than the rate of any single one of the bonded transceivers 270. Nevertheless, the rate at which the bonded transceivers 270 can communicate data may be less than the rate at which the compute nodes 250 can transmit data to them such that the bonded transceivers 270 represent a congestion point within the access network 222. In other examples, other types of congestion points may exist within the access modules 252.

Figure 11:
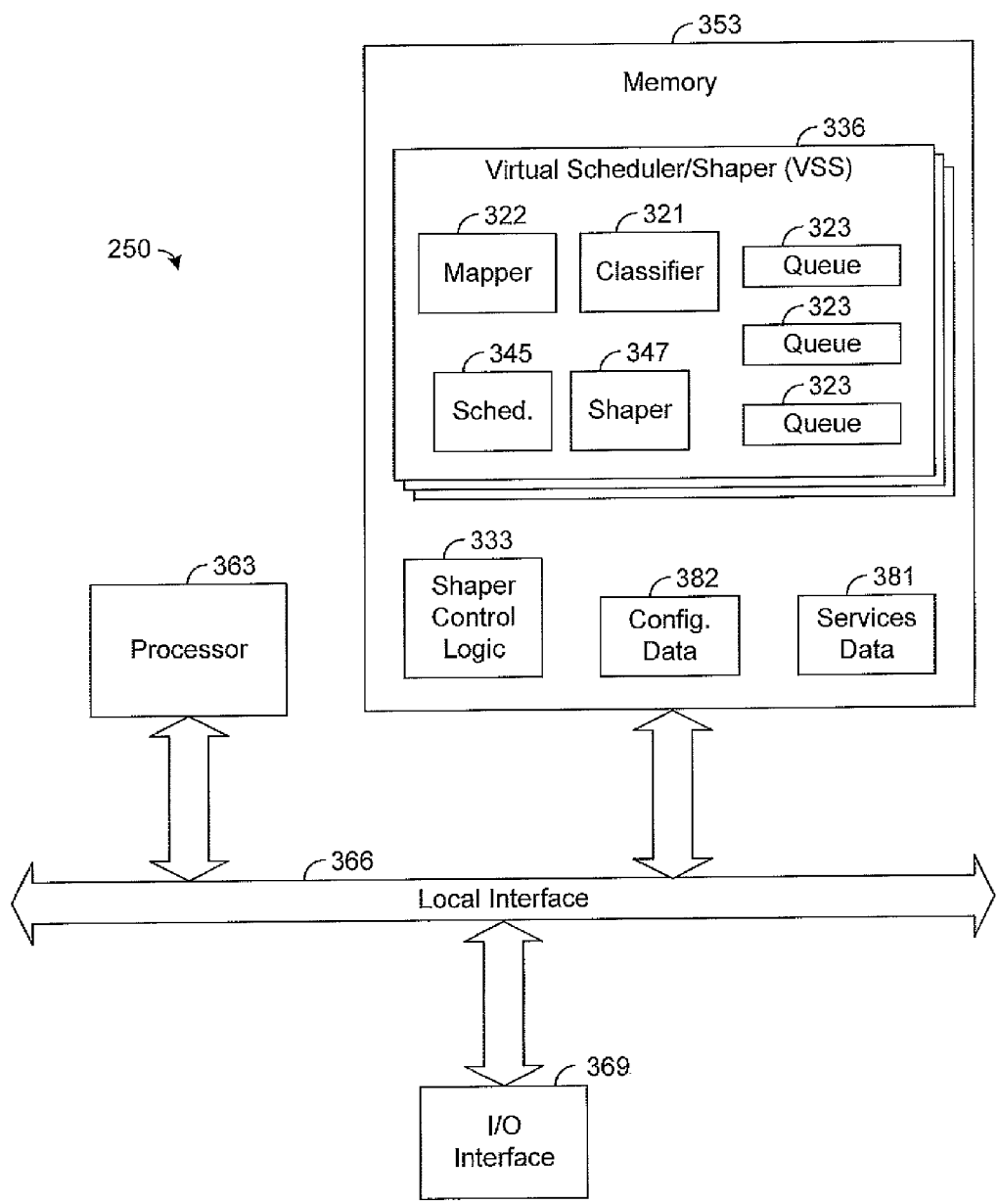
FIG. 11 is a block diagram illustrating an exemplary embodiment of a compute node, such as is depicted by FIG. 9.

FIG. 11 depicts an exemplary embodiment of a compute node 250. Each compute node 250 may be implemented as a server that includes computing hardware and software resources for processing packet flows received from the switching fabric 241. As an example, similar to the access module 52 depicted by FIG. 3, a compute node 250 may include one or more instances of scheduler/shaper logic 336, which functions similarly to the schedulers 75 and shapers 77 depicted by FIG. 3, as will be described in more detail below. In this regard, each set of scheduler/shaper logic 336, also sometimes referred to hereafter as a "virtual scheduler/shaper" or "VSS" in embodiments for which the logic 336 is implemented in software, defines both a scheduler 345 that functions similar to a scheduler 75 depicted by FIG. 3 and a shaper 347 that functions similar to a shaper 77 depicted by FIG. 3. Each VSS 336 may also include a classifier 321, a mapper 322, and a plurality of queues 323 that perform similar functions as described for the classifier 66, mapper 69, and queues 72, respectively, as will be described in more detail below. In other embodiments, the use of classifiers 321 and mappers 322 is unnecessary. In one embodiment, each set of scheduler/shaper logic 336 corresponds to a congestion point on an access module 252 (e.g., an OLT) and processes (e.g., schedules and shapes) flows that pass through the congestion point. Note that multiple sets of scheduler/shaper logic 336 may correspond to the same congestion point and, thus, process packet flows for the congestion point.

As shown by FIG. 11, a compute node 250 may also include one or more instances of shaper control logic (SCL) 333, which functions similarly to the shaper control logic 82 depicted by FIG. 3, as will be described in more detail below. The shaper control logic 333 may be associated with configuration data 382 and services data 381, as will be described in more detail below.

In the exemplary embodiment depicted by FIG. 11, shaper control logic 333, and scheduler/shaper logic 336 are all implemented in software and stored within memory 353 of the compute node 250. In other embodiments, any of the shaper control logic 333, configuration data 382, services data 381, and scheduler/shaper logic 336 may be implemented in hardware (e.g., FPGAs) or any combination of hardware, software, and firmware.

Note that any of the shaper control logic 333, configuration data 382, services data 381, and scheduler/shaper logic 336, when implemented in software, can be stored and transported on any non-transitory computer-readable medium for use by or in connection with an instruction execution apparatus that can fetch and execute instructions. In the context of this document, a "computer-readable medium" can be any means that can contain or store a computer program for use by or in connection with an instruction execution apparatus. For illustrative purposes it will be assumed hereafter, unless otherwise stated, that the scheduler/shaper logic 336 is implemented in software and each instance of this logic 336 will be referred to as a "virtual scheduler/shaper" or "VSS." However, it should be emphasized that at least portions of the scheduler/shaper logic 336 may be implemented in hardware in other embodiments.

The exemplary compute node 250 depicted by FIG. 11 comprises at least one conventional processor 363, such as a central processing unit (CPU), that communicates to and drives the other elements within the compute node 250 via a local interface 366, which can include at least one bus. Furthermore, at least one input/output (I/O) interface 369 may be coupled to the switching fabric 241 (FIG. 9) and used to communicate data between the compute node 250 and the switching fabric 241. Note that any compute node may include various types of virtualized network functions in addition to the ones (e.g., VSSs 336) shown by FIG. 9.

In the downstream direction, each packet flow is allocated to a respective virtual function VSS 336 on a compute node 250, and the switching fabric 241 is configured to forward the packets for a given packet flow to the compute node 250 having the VSS 336 to which the flow is allocated. In addition, packets from the same flow are forwarded to the same VSS 336 for processing.

When a packet is received by a VSS 336, the classifier 321 of such VSS 336 is configured to classify the packet, as described above for the classifier 66 of FIG. 3. Further, the mapper 322 of this VSS 336 is configured to map the packet to a queue 323 based on the packet's classification, as determined by the classifier 321, and the mapper 322 transmits each packet to the queue 323 to which it is mapped. Note that, as described above for the embodiment depicted by FIG. 3, the packets in the same queue 323 have the same classification. In one exemplary embodiment, each queue 323 corresponds to a respective service of a respective customer or group of customers. That is, all of the packets for a given service are mapped to the same queue 323 and ultimately flow through the same congestion point, but other configurations of the queues 323 are possible in other embodiments. In addition, as noted above, packets of a packet flow may be received and processed by a VSS 336 without passing through a classifier 321 or a mapper 322. That is, it is unnecessary for a VSS 336 to include a classifier 321 or a mapper 322.

Multiple queues 323 feeding the same congestion point (e.g., an OLT on an access module 252) may be controlled by the same VSS 336 that pulls packets from the queues 323 according to a desired scheduling algorithm, which takes into account the priorities and weights assigned to the services and, hence, the queues 323. Such VSS 336 is further configured to dynamically control (e.g., limit) the rate of packets pulled from such queues 323 and processed by the VSS 336, as will be described in more detail hereafter. As the VSS 336 pulls packets from its queues 323, the virtual scheduler/shaper 336 outputs the packets from the compute node 250 to the switching fabric 241, which forwards the packets to the access module 252 that is to transmit the packets to the CPE 15.

As an example, for packets to be carried by a particular PON, the packets may be transmitted to a transceiver 270 (FIG. 10), such as an OLT, that is coupled to the PON. In such example, the transceiver 270 converts the data packets from the compute node 250 into the optical domain from the electrical domain for communication across a communication connection 34 (e.g., an optical fiber of the PON). In other embodiments, the packets from a given VSS 336 may go to a plurality of transceivers 270 (e.g., DSL transceiver) for communication across a plurality of communication connections 34. As an example, the plurality of communication connections 34 may be bonded such that fragments of each packet are transmitted across each of the plurality of communication connections 34. In other examples, other techniques for communicating the packets via the communication connections 34 are possible.

As shown by FIG. 11, any of the compute nodes 250 may have multiple instances of the VSS 336 where each instance of the VSS 336 controls a plurality of packet flows for a given congestion point, noting that multiple VSSs 336 may control packet flows to the same congestion point. As an example, a first VSS 336 may send packets of a first plurality of flows to a congestion point, while a second VSS 336 on the same or different compute node 250 may send packets of a second plurality of flows to the same congestion point. Since instances of the VSSs 336 can be easily and efficiently created as they are needed, such as when more customers or services are added to the system, the access network 222 can be scaled as needed at a relatively low cost.

As described above, multiple VSSs 336 may send packets to the same congestion point, and multiple VSSs 336 feeding the same congestion point may reside on different compute nodes 250. The shaper control logic 333 is configured to control the shaper rates for each VSS 336 corresponding to a given congestion point such that a fair allocation of bandwidth is achieved for the packet flows passing through the congestion point. In this regard, the bandwidth through the congestion point is fairly allocated so that flows of the same class passing through the congestion point achieve the desired performance.

As shown by FIG. 11, the shaper control logic 333 may reside on any of the compute nodes 250 and is configured to communicate with each VSS 336 operating under its control, including VSSs 336, if any, residing on the same compute node 250 and VSSs 336, if any, residing on other compute nodes 250. The shaper control logic 333 communicates control information with the VSS 336 functions under its control via a control channel. Specifically, the shaper control logic 333 may communicate with each VSS 336 under its control via the switching fabric 241 to discover the traffic load conditions at each such VSS 336. For any VSS 336 on the same compute node 250 as the shaper control logic 333, the control channel may or may not forward information via the switching fabric 241.

If desired, the same shaper control logic 333 may control all of the VSSs 336 or a subset of the VSSs 336. As an example, a given congestion point may correspond to a respective set of shaper control logic 333 that controls the shaper rates of the VSSs 336 feeding that congestion point. In such example, there may be a separate set of shaper control logic 333 for each congestion point. In other embodiments, the same set of shaper control logic 333 may control the VSSs 336 for multiple congestion points. It is unnecessary for each set of shaper control logic 333 to reside on the same compute node 250, and it is unnecessary (although possible) for the shaper control logic 333 to reside on the same compute node 250 as a VSS 336 under its control. As an example, it is possible for the shaper control logic 333 shown in FIG. 9 to control any or all of the depicted VSSs 336.

As an example, the load information from a given VSS 336 may include an estimate of the data rate for the flow of data currently passing through each queue 323 of the VSS 336. As described above for the queues 72 on the access modules 52 of FIG. 3, such data rate may be estimated based on the amount of data stored in each queue 323 or the amount of data that has recently passed through the queue 323. In one embodiment, for each queue 323, the load information indicates the maximum of (1) a data rate that would be required to communicate all of the data currently in the queue 323 over a predefined time period and (2) a data rate measured or otherwise determined for the queue 323 over a recent time interval. In other embodiments, other types of load information are possible.

In one exemplary embodiment, the load information for a given VSS 336 is aggregated on a per class-of-service (CoS) basis. That is, for each class of service, the shaper control logic 333 calculates a value indicative of the total estimated amount of data that is currently associated with the VSS 336 (e.g., queued for or ingressing to the VSS 336 for that class of service). Such information may be determined from the amount of data currently in or passing through the queues 323 associated with such class of service, as described above. In some cases, the aggregated amount may be limited based on predefined constraints (e.g., burst size or rate limitations) associated with the class of service to ensure that the class of service is not oversubscribed with bandwidth. In other embodiments, it is unnecessary for the load information to be aggregated, and other types of aggregation are possible.

After receiving current load information for each VSS 336 under its control, the shaper control logic 333 sets the shaper rate of each such VSS 336 according to a desired allocation algorithm based on the load information of all of the VSSs 336 feeding the same congestion point. Each VSS 336 remains at its updated shaper rate for a given time period, until the shaper control logic 333 receives new loading information from the VSSs 336 in order to perform another shaper update. Thus, the shaper rates are repetitively updated from time-to-time in order to accommodate changing traffic load conditions thereby realizing a desired allocation algorithm that fairly allocates available downstream bandwidth at a given congestion point among the VSSs 336 feeding that congestion point, as will be described in more detail hereafter.

In this regard, as described above, the shaper control logic 333 may control the shaper rates such that the total rate at which packets are transmitted to a congestion point from all of the VSSs 336 feeding that congestion point remains at or below the maximum downstream capacity of the congestion point, thereby preventing data loss at the access modules 252. Thus, packet loss occurs in a controlled and fair manner in the queues 323 of the compute nodes 250 or otherwise in the compute nodes 250 according to the allocation algorithm under the control of the shaper control logic 333. In other embodiments, other algorithms for controlling the shaper rates are possible.

In one exemplary embodiment, the shaper control logic 333 uses the same allocation algorithm for each VSS 336 corresponding to a given congestion point in order to determine all shaper rates for the congestion point. Based on the traffic load conditions of all of the corresponding VSSs 336, the shaper control logic 333 is configured to determine how much of the overall downstream bandwidth available for the congestion point is to be allocated to each shaper 347 so that this available downstream bandwidth is fairly allocated among the shapers 347 of all of the VSSs 336 feeding the same congestion point. The shaper control logic 333 then adjusts the shaper rates of the VSSs 336 according to the determined allocation. By performing such techniques for each VSS 336, the allocation of available downstream bandwidth is performed in a fair manner across all VSSs 336 for the same congestion point such that services of the same class passing through the same congestion point achieve a desired (e.g., same or similar) performance.

The allocation algorithm implemented by the shaper control logic 333 may be based on many factors. In one exemplary embodiment, the allocation algorithm is based on services data 381 and configuration data 382 that are stored in memory 353 of at least one compute node 250. Like the configuration data 82 and the services data 81 described above, the configuration data 382 is indicative of the configuration and, more specifically, the capacity of the system, including the capacity of each congestion point in the access modules 252, and the services data 381 includes parameters indicative of the services, such as the guaranteed and peak rates, weight, and priority associated with each service. Note that the services data 381 and configuration data 382 may be first provisioned by a technician or otherwise defined prior to operation of the access network 222.

Note that, in the embodiments described above, the shaper control logic 333 for implementing a desired allocation algorithm for a congestion point is centralized at a compute node 250. However, if desired, the shaper control logic 333 may be distributed across the compute nodes 250 or other resources. In such embodiment, the distributed instances of the shaper control logic 333 may communicate with each other across the switching fabric 241 or otherwise using a control channel. In some embodiments, there may be an instance of shaper control logic 333 for each respective congestion point. Other configurations of the shaper control logic 333 are possible in other embodiments.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

The invention claimed is:

1. An access network, comprising:
   at least one network interface coupled to at least one network connection for receiving a plurality of packet flows from a network;
   at least one access module having at least one transceiver defining a congestion point through which each of the plurality packet flows passes, the at least one transceiver coupled to at least one communication connection for communicating the plurality of packet flows to customer premises equipment at one or more customer premises;
   at least one compute node having a plurality of scheduler/shapers to which the plurality of packet flows are allocated, each of the scheduler/shapers configured to schedule and shape the packet flows for transmission of the packet flows through the congestion point such that packet loss in the congestion point for the plurality of packet flows is prevented;
   a switching fabric coupled to the at least one network interface, the at least one access module, and the at least one compute node; and
   shaper control logic configured to determine load information indicative of traffic load conditions for the plurality of packet flows at each of the plurality of scheduler/shapers, the shaper control logic further configured to control shaper rates for each of the plurality of scheduler/shapers based on the load information.

2. The access network of claim 1, wherein the at least one transceiver comprises an optical line terminal of a passive optical network.

3. The access network of claim 1, wherein at least one of the plurality of scheduler/shapers comprises a classifier, a mapper, and a plurality of queues, wherein the classifier is configured to classify data packets received by the at least one scheduler/shaper, and wherein the mapper is configured to map the data packets to the plurality of queues.

4. The access network of claim 1, wherein the plurality of scheduler/shapers includes at least a first scheduler/shaper and a second scheduler/shaper, wherein the shaper control logic is configured to control a shaper rate for the first scheduler/shaper based on traffic load conditions for traffic processed by the second scheduler/shaper.

5. The access network of claim 4, wherein the first scheduler/shaper and the second scheduler/shaper are both implemented on a single compute node.

6. The access network of claim 4, wherein the at least one compute node includes a first compute node and a second compute node, and wherein the first scheduler/shaper is implemented on the first compute node and the second scheduler/shaper is implemented on the second compute node.

7. The access network of claim 4, wherein the shaper control logic is configured to communicate with the first scheduler/shaper via the switching fabric.

8. A non-transitory computer-readable medium embodying at least one program executable in at least one processor, comprising:
   a first scheduler/shaper for scheduling a first plurality of packet flows for transmission of the first plurality of packet flows through at least one access module;
   a second scheduler/shaper for scheduling a second plurality of packet flows for transmission of the second plurality of packet flows through the at least one access module, wherein the first plurality of packet flows and the second plurality of packet flows pass through a congestion point, and wherein the first scheduler/shaper and the second scheduler/shaper are configured to control the first plurality of packet flows and the second plurality of packet flows such that packet loss in the congestion point for the first plurality of packet flows and the second plurality of packet flows is prevented; and
   logic for determining traffic load conditions associated with the first scheduler/shaper and the second scheduler/shaper and for controlling shaper rates for the first scheduler/shaper and the second scheduler/shaper based on the traffic load conditions, wherein the logic for controlling the shaper rates comprises logic for controlling a shaper rate of the first scheduler/shaper based on traffic load conditions for the second scheduler/shaper.

9. The non-transitory computer-readable medium of claim 8, wherein the congestion point is on the at least one access module.

10. A communication method for use at an access network, comprising:
    receiving a first plurality of packet flows and a second plurality of packet flows from a network;
    transmitting the first plurality of packet flows and the second plurality of packet flows through a switching fabric to at least one compute node of a plurality of compute nodes that are coupled to the switching fabric;
    processing the first plurality of packet flows with a first scheduler/shaper at the at least one compute node, the processing the first plurality of packet flows comprising scheduling and shaping the first plurality of packet flows for transmission of the first plurality of packet flows through a congestion point on at least one access module coupled to the switching fabric;

processing the second plurality of packet flows with a second scheduler/shaper at the at least one compute node, the processing the second plurality of packet flows comprising scheduling and shaping the second plurality of packet flows for transmission of the second plurality of packet flows through the congestion point, wherein the processing the first plurality of packet flows and the processing the second plurality of packet flows are performed such that packet loss in the congestion point for the first plurality of packet flows and the second plurality of packet flows is prevented;

transmitting the first plurality of packet flows from the first scheduler/shaper through the congestion point;

transmitting the second plurality of packet flows from the second scheduler/shaper through the congestion point;

determining traffic load conditions for the first plurality of packet flows and the second plurality of packet flows in the at least one compute node; and controlling shaper rates for the first scheduler/shaper and the second scheduler/shaper based on the traffic load conditions.

11. The access network of claim 10, wherein the congestion point comprises an optical line terminal.

12. The access network of claim 10, wherein the controlling comprises controlling a shaper rate for the first scheduler/shaper based on traffic load conditions for the second plurality of packet flows.

13. A communication method, comprising:

receiving a first plurality of packet flows and a second plurality of packet flows from a network;

transmitting the first plurality of packet flows and the second plurality of packet flows through a congestion point;

scheduling the first plurality of packet flows with a first scheduler/shaper for transmission of the first plurality of packet flows through at least one access module;

limiting a data rate for transmissions of the first plurality of packet flows by the first scheduler/shaper;

scheduling the second plurality of packet flows with a second scheduler/shaper for transmission of the second plurality of packet flows through the at least one access module;

limiting a data rate for transmissions of the second plurality of packet flows by the second scheduler/shaper;

determining traffic load conditions for the first scheduler/shaper and the second scheduler/shaper; and controlling the first scheduler/shaper and the second scheduler/shaper based on the traffic load conditions, the controlling comprising controlling a shaper rate of the first scheduler/shaper based on traffic load conditions for the second scheduler/shaper.

14. The method of claim 13, wherein the congestion point is on the at least one access module.

15. The method of claim 14, wherein the congestion point comprises an optical line terminal.

16. The method of claim 13, wherein the congestion point is at a network connection from which the first plurality of packet flows and the second plurality of packet flows are received.

17. The method of claim 13, further comprising transmitting the first plurality of packet flows and the second plurality of packet flows through a switching network to at least one compute node of a plurality of compute nodes that are coupled to the switching fabric, the at least one compute node having the first scheduler/shaper, and the second scheduler/shaper.

18. The method of claim 17, further comprising transmitting the first plurality of packet flows and the second plurality of packet flows from the at least one compute node through the switching fabric to the at least one access module.

* * * * *